June 24, 1930.  J. M. BLACKBURN ET AL  1,768,107
VEHICLE SIGNAL
Filed Sept. 29, 1928  2 Sheets-Sheet 1
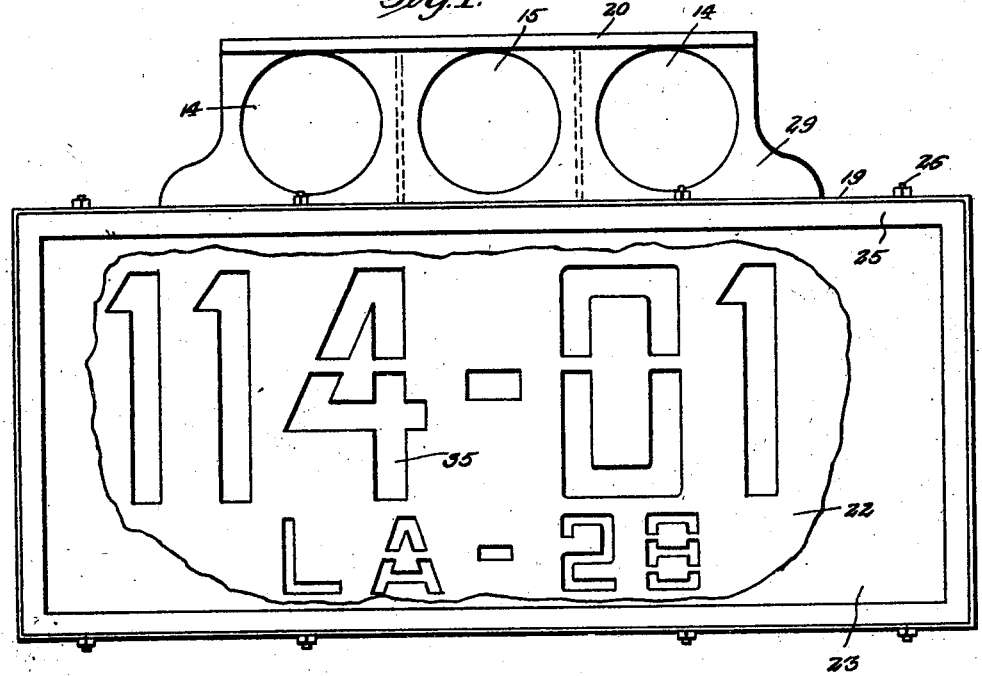
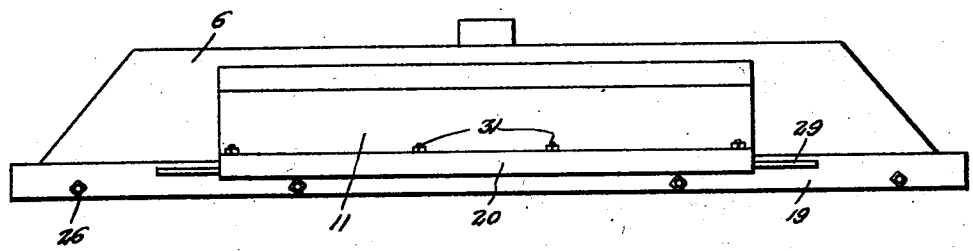
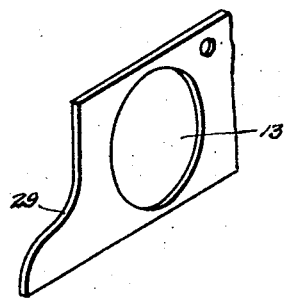
Inventor
J.M.Blackburn
F.R.Lauden,
By Clarence A. O'Brien
Attorney

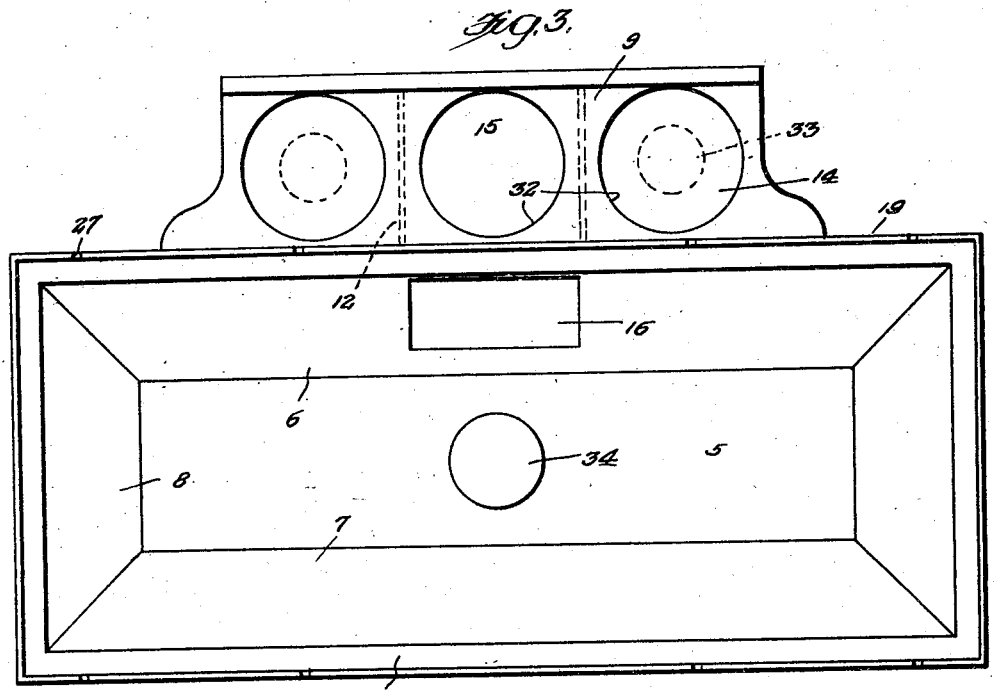
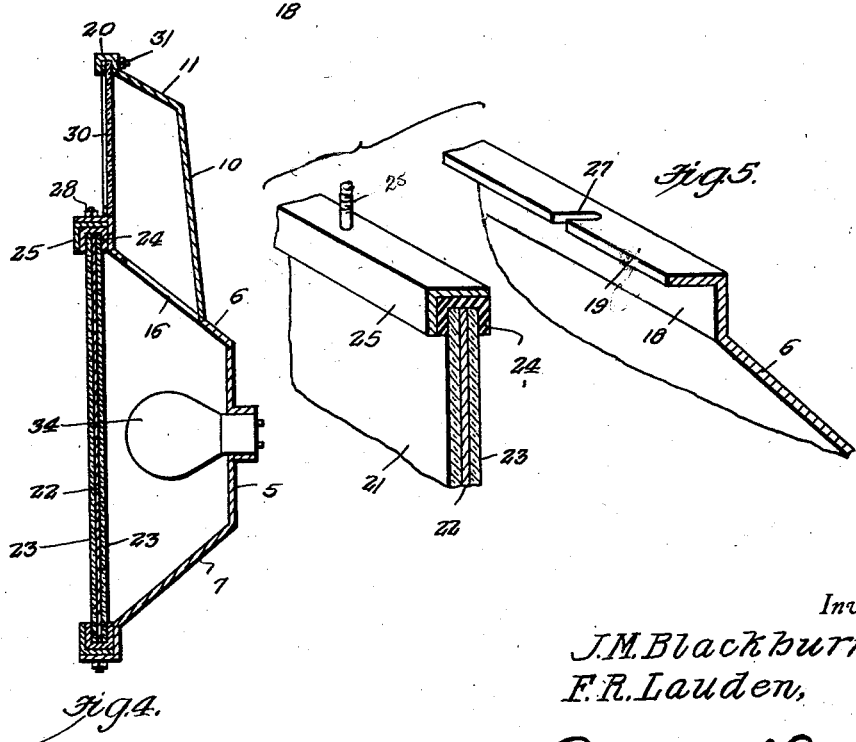

Patented June 24, 1930

1,768,107

UNITED STATES PATENT OFFICE

JOHN MICHAEL BLACKBURN AND FRED RAYMOND LAUDEN, OF FRANKLIN, LOUISIANA

VEHICLE SIGNAL

Application filed September 29, 1928. Serial No. 309,165.

The present invention relates to vehicle signals, and more particularly to a signal housing within which the signal lamp is mounted. The invention has for its principle object to provide an illuminated license tag holder and a signal housing each stamped or cast from single sheets of material permanently attached and providing novel means for attaching the respective cover plates to the open sides of the housings.

A further object of the invention is to provide a signal housing of this character including a main signal housing, and a supplemental signal housing disposed at the upper portion thereof, and arranging said supplemental signal housing into a series of individual compartments, one of which is communicable with the main signal housing for utilizing the lamp within said main signal housing for illuminating said communicating compartment of the supplemental signal housing.

A still further object is to provide individual cover plates for each portion of the signal housing.

Other objects and advantages reside in the special construction, combination and arrangement of the various elements forming the invention as more fully hereinafter described and claimed, reference being had to the accompanying drawings forming part hereof wherein like numerals refer to like parts throughout, and in which:

Figure 1 is a front elevational view of the device.

Figure 2 is a top plan view.

Figure 3 is a front elevational view with the cover plate removed.

Figure 4 is a vertical transverse sectional view taken substantially along a center line through the upper and lower signal housing.

Figure 5 is a fragmentary group perspective view of the attaching edges of the main signal housing and the cover provided therefor, and Figure 6 is a fragmentary perspective view of one end of the cover plate for the supplemental signal housing.

Referring now to the drawings in detail, for the purpose of illustration we have disclosed a preferred embodiment of the invention comprising a main signal housing composed of a rear wall 5, and forwardly diverging top and bottom sections 6 and 7, respectively, and end sections 8. A supplemental signal housing 9 extends upwardly from the top section 6 and includes a slightly forwardly inclined rear wall 10, and slightly upwardly inclined top section 11. The supplemental housing 9 is provided with a pair of spaced vertically extending partitions 12 separating said housing into a series of separate compartments 13. The compartments 13 include end compartments 14 and an intermediate compartment 15. The intermediate compartment 15 communicates with the interior of the main housing by means of an opening 16 formed in the top section 6. The main housing and supplemental housing are preferably each cast or stamped from single sheets of metal and secured in position to each other in any suitable manner as by welding. The front side of each of the housings is opened, and about the edges of said main housing is formed an angular flange 17, said flanges including a shoulder portion 18, and an outwardly extending portion 19. The upper edge of the supplemental housing is likewise constructed with an angular flange 20 of a channel shaped formation with the channeled portion thereof opening downwardly. A laminated cover 21 is arranged for fitting over the open front side of the main housing, said cover being formed of an opaque central sheet 22 at opposite sides of which is arranged a sheet of transparent material 23, such as isinglass, glass or the like. About the edges of the cover 21 is a strip of padding material 24, such as rubber, felt or the like, with the edges of the padding disposed in overlapping relation with the opposite sides of the cover. An angular attaching strip 25 is fitted about the padding 24 with one angular portion of said strip disposed upon the outer edge of the padding and the other angular portion thereof disposed about the outer side thereof. Stud bolts 26 extend outwardly from the portion of the angular strip 25 seated upon the outer edge of the padding and are arranged for sliding into slotted opening 27 formed in the outwardly extending end portion 19 of the housing. The portion of the attaching strip 25 disposed about the edges of the cover is thus adapted to seat against the inner face of the outwardly extending flange 19 of the housing, whereupon nuts 28 are threaded on the studs 26 for securing the parts in assembled position.

A laminated cover is also provided for the open portion of the supplemental housing, said cover comprising an opaque shield 29 disposed outwardly of a transparent cover section 30. The upper edges of the shield and cover section are inserted within the channel of the flange 20 and secured in position therein by means of bolts 31 extending through the flange 20. The cover elements 29 and 30 are prevented from sliding rearwardly off the edge of the flange 19 by abutting the front edges of the partitions 12.

The outer section 29 of the supplemental cover is provided with a series of openings 32 communicating the respective compartments 14 and 15 of the supplemental housing. An electric lamp 33 is mounted within each of the end compartments 14 of the supplemental housing, and a similar lamp 34 is mounted in the rear wall 5 of the main housing. The light from the lamp 34 in the main housing will also enter the center compartment 15 of the supplemental housing, and will serve to reflect through the opening in said compartment, as well as illuminate the stencilled legend 35 formed in the central sheet 22 of the main housing. It will thus be apparent that the stencilled sheet 22 may constitute the license plate of the vehicle, and will be suitably illuminated, while driving at night, by the lamp 34. The central compartment 15 of the supplemental housing may also serve as the tail light for the vehicle while the two end compartments 14 may serve as a housing for lamps connected with a parking switch or stop switch.

The signal housing constructed in accordance with our invention presents a neat and attractive appearance and by virtue of the manner in which the housing units may be constructed from single sheets of material, stamped in the manner as illustrated in the drawing may be produced at a relatively low cost.

The cut-out legend in the stencil plate will also prominently appear in the day-time, as well as at night and by providing a glass or similar cover for the plate the same will not become tarnished or discolored.

It is obvious that our invention is susceptible to various changes and modifications in construction without departing from the spirit of the invention or the scope of the appended claims, and we accordingly claim all such forms of the device to which we are entitled.

Having thus described the invention, what we claim as new and desire to secure by Letters Patent is:—

1. In a signal housing, a main housing, and a supplemental housing arranged in superposed relation, each of said housings being stamped from single sheets of material and permanently secured together with one side open, vertically extending partitions formed in said supplemental housing defining central and end compartments therein, said main housing having its upper portion provided with an opening communicating with said central compartment, a flanged edge formed about the open side of said main housing, a channeled edge formed along the upper edge of said supplemental housing with the channeled portion thereof opening downwardly, cover plates for the front portion of each of said housings, an angular attaching strip arranged about the edges of the cover plate for said main housing, stud bolts extending outwardly from the edges of said attaching strip, said flanged edge of the main compartment having slotted recesses extending inwardly therefrom for receiving said stud bolts whereby to permit the threading of the nuts on said bolts for securing the cover in position, said cover plate for the supplemental housing having its upper edge inserted in the channel at the upper edge of said housing, said supplemental cover plate including a transparent cover section and a metallic retaining plate having openings formed therein communicating with each of the compartments of the supplemental housing and with the lower edges of said supplemental cover plate resting upon the upper flange of the main housing and inwardly of the bolt carried thereby for retaining said supplemental cover plate in position.

2. In a signal housing, a main housing, a supplemental housing arranged above the main housing and fixedly secured thereto, said housings having communication with each other and each of the housings being open at their front side, said main housings having the edges about its open side formed about the shoulder having its outer surface disposed at a vertical plane and with a flange extending outwardly at right angles from the shoulder with slotted openings therein, said supplemental housing having its upper edge formed with a downwardly disposed channel, individual cover plates for each of said housings, and means for securing the main cover plates in position, comprising a strip disposed above the edges of the cover with its edges disposed at right angles to each other, stud bolts extending outwardly from the edge of said strip and insertable in said notches for securing the parts in assembled position, said supplemental cover plate having its upper edge inserted in said channel and with its lower edge resting upon the upper edge of the opening of the main housing and disposed inwardly of the bolt carried thereby for retaining the supplemental cover in position.

In testimony whereof we affix our signatures.

JOHN MICHAEL BLACKBURN.
FRED RAYMOND LAUDEN.